US012227406B2

(12) United States Patent
Kuo et al.

(10) Patent No.: US 12,227,406 B2

(45) **Date of Patent: *Feb. 18, 2025**

(54) FLUID MATERIAL DISPENSING APPARATUS CAPABLE OF FLEXIBLY ADJUSTING TEMPERATURE OF FLUID MATERIAL TO BE DISPENSED

(71) Applicant: Botrista, Inc., Dover, DE (US)

(72) Inventors: Wu-Chou Kuo, San Francisco, CA (US); Yu-Min Lee, Taipei (TW); Yu Wei Chen, San Francisco, CA (US)

(73) Assignee: BOTRISTA, INC., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,899

(22) Filed: Jul. 3, 2024

(65) Prior Publication Data

US 2024/0359963 A1 Oct. 31, 2024

Related U.S. Application Data

(60) Continuation-in-part of application No. 18/375,075, filed on Sep. 29, 2023, now Pat. No. 12,077,423, (Continued)

(51) Int. Cl.
*B67D 1/07* (2006.01)
*B67D 1/12* (2006.01)

(52) U.S. Cl.
CPC ............. *B67D 1/07* (2013.01); *B67D 1/1277* (2013.01)

(58) Field of Classification Search
CPC ................................ B67D 1/07; B67D 1/1277
See application file for complete search history.

(56) References Cited

U.S. PATENT DOCUMENTS 6,669,051 B1 * 12/2003 Phallen ..................... B67C 3/28 222/394
6,695,168 B2 * 2/2004 Pinedjian ............. B67D 1/0086 222/54

(Continued)

FOREIGN PATENT DOCUMENTS

CN 102781293 A 11/2012
CN 104154267 A 11/2014

(Continued)

OTHER PUBLICATIONS

Chinese Office Action and Search Report for Chinese Application No. 202111040353.0, dated Jan. 27, 2024, with partial English translation.

(Continued)

*Primary Examiner* — Jeremy Carroll

(74) *Attorney, Agent, or Firm* — Birch, Stewart, Kolasch & Birch, LLP

(57) ABSTRACT

A fluid material dispensing apparatus include: a first nozzle; a second nozzle; a pump, arranged to operably extract a fluid material from the material container and to operably push the fluid material to flow toward the first nozzle; a material-temperature adjustment device, coupled with the first nozzle; a water-temperature adjustment device, coupled between a water input port and the second nozzle; and a control circuit for controlling the material-temperature adjustment device to adjust a temperature of the fluid material to produce and output a temperature-adjusted material to the first nozzle; wherein the control circuit also controls the water-temperature adjustment device to adjust a temperature of water transmitted from the water input port to produce and output a temperature-adjusted water to the second nozzle.

29 Claims, 9 Drawing Sheets

Related U.S. Application Data which is a division of application No. 17/467,960, filed on Sep. 7, 2021, now Pat. No. 11,814,280, which is a continuation-in-part of application No. 17/218,314, filed on Mar. 31, 2021, now Pat. No. 11,597,642.

(60) Provisional application No. 63/636,426, filed on Apr. 19, 2024, provisional application No. 63/143,217, filed on Jan. 29, 2021, provisional application No. 63/110,621, filed on Nov. 6, 2020.

(56) References Cited

U.S. PATENT DOCUMENTS

| | | | | |
|---|---|---|---|---|
| 10,561,281 | B1 * | 2/2020 | Lu | E03C 1/0408 |
| 10,662,053 | B2 * | 5/2020 | Petermann | B67D 1/0888 |
| 10,689,239 | B1 * | 6/2020 | Siegel | B67D 1/0021 |
| 11,407,629 | B1 * | 8/2022 | Siegel | B67D 1/0878 |
| 2007/0151992 | A1 * | 7/2007 | Carlson | B67D 1/0867 222/509 |
| 2008/0141702 | A1 * | 6/2008 | Gagliano | B67D 1/1275 62/389 |
| 2010/0176147 | A1 * | 7/2010 | Segers | B67D 1/0837 222/1 |
| 2011/0049185 | A1 * | 3/2011 | Buchik | B67D 1/1438 141/69 |
| 2012/0328465 | A1 | 12/2012 | Eder et al. | |
| 2016/0297665 | A1 * | 10/2016 | Petermann | B67D 1/1422 |
| 2021/0316979 | A1 * | 10/2021 | Hayes-Pankhurst | B67D 1/1231 |
| 2023/0380442 | A1 * | 11/2023 | Carter | A23G 9/228 |
| 2023/0380443 | A1 * | 11/2023 | Cloud | F25B 41/20 |

FOREIGN PATENT DOCUMENTS

| | | | |
|---|---|---|---|
| CN | 102781293 | B | 8/2015 |
| WO | WO 2011/107574 | A2 | 9/2011 |

OTHER PUBLICATIONS

Taiwanese Notice of Allowance dated Dec. 10, 2021 for Application No. 110133099 with an English translation.

Taiwanese Office Action and Search Report, dated Jul. 14, 2021, for Taiwanese Application No. 110112000, with a partial English translation of the Taiwanese Office Action and a full English translation of the Taiwanese Search Report.

U.S. Office Action for U.S. Appl. No. 18/816,620, dated Dec. 17, 2024.

* cited by examiner

FLUID MATERIAL DISPENSING APPARATUS CAPABLE OF FLEXIBLY ADJUSTING TEMPERATURE OF FLUID MATERIAL TO BE DISPENSED

CROSS-REFERENCE TO RELATED APPLICATIONS

This application is a Continuation-In-Part of and claims the benefit of priority to U.S. patent application Ser. No. 18/375,075, filed on Sep. 29, 2023, which is a Divisional of U.S. patent application Ser. No. 17/467,960, filed on Sep. 7, 2021, now U.S. Pat. No. 11,814,280, issued on Nov. 14, 2023, which is a Continuation-In-Part of and claims the benefit of priority to U.S. patent application Ser. No. 17/218,314, filed on Mar. 31, 2021, now U.S. Pat. No. 11,597,642, issued on Mar. 7, 2022; which claims the benefit of U.S. Provisional Application Ser. No. 63/110,621, filed on Nov. 6, 2020, and also claims the benefit of U.S. Provisional Application Ser. No. 63/143,217, filed on Jan. 29, 2021; the entirety of which is incorporated herein by reference for all purposes.

This application claims the benefit of priority to U.S. Provisional Application Ser. No. 63/636,426, filed on Apr. 19, 2024; the entirety of which is incorporated herein by reference for all purposes.

BACKGROUND

The disclosure generally relates to a fluid material dispensing apparatus and, more particularly, to a fluid material dispensing apparatus capable of flexibly adjusting the temperature of water to be dispensed.

For many consumers, freshly made beverages are more attractive than factory-produced canned or bottled beverages in many aspects, such as freshness, taste, and/or flexibility of customizing ingredient combinations. Therefore, many restaurants and beverage vendors offer a variety of freshly made beverages to meet the needs of their customers. The traditional approach of manually preparing freshly made beverages has many disadvantages. For example, it is not easy to maintain the taste consistency of freshly made beverages, personnel training requires considerable time and cost, and the preparation of the freshly made beverages often consumes a lot of labor time, or the like. As a result of rising labor costs and other factors (e.g., increased operating costs due to the impact of the pandemic or inflation), many restaurants and beverage vendors have begun to use a variety of machinery and equipment to provide or assist in the preparation of freshly-made beverages in order to reduce the required labor time and costs.

As is well known, different customers have varying preferences or needs regarding the temperature of their beverages. However, the traditional beverage dispensers lack the ability of flexibly adjusting the temperature of beverages according to customer preferences, so they usually can only provide beverages at a fixed temperature. If a customer wants to change the temperature of the beverage, either the customer or the staff would need to add ice into or heat the beverage made by the traditional beverage dispenser. Such approaches are not only inconvenient but also make it difficult to precisely control the temperature of the resulting beverage, and may even adversely affect the taste of the resulting beverage.

SUMMARY

An example embodiment of a fluid material dispensing apparatus is disclosed, comprising: a first nozzle; a second nozzle; a pump, coupled between an outlet connector of a material container and the first nozzle, and arranged to operably extract a fluid material from the material container and to operably push the fluid material to flow toward the first nozzle; a material-temperature adjustment device, coupled with the first nozzle; a water-temperature adjustment device, coupled between a water input port and the second nozzle; and a control circuit, coupled with the pump, the material-temperature adjustment device, and the water-temperature adjustment device, and arranged to operably control the pump; wherein the control circuit is further arranged to operably control the material-temperature adjustment device to adjust a temperature of the fluid material transmitted from the pump to produce and output temperature-adjusted material to the first nozzle, so that the first nozzle outputs the temperature-adjusted material to the target container; and wherein the control circuit is further arranged to operably control the water-temperature adjustment device to adjust a temperature of water transmitted from the water input port to produce and output temperature-adjusted water to the second nozzle, so that the second nozzle outputs the temperature-adjusted water to the target container.

Another example embodiment of a fluid material dispensing apparatus is disclosed, comprising: a first nozzle; a first pump, coupled between a first outlet connector of a first material container and the first nozzle, and arranged to operably extract a first fluid material from the first material container and to operably push the first fluid material to flow toward the first nozzle; a first material-temperature adjustment device, coupled with the first nozzle; a second nozzle; a second pump, coupled between a second outlet connector of a second material container and the second nozzle, and arranged to operably extract a second fluid material from the second material container and to operably push the second fluid material to flow toward the second nozzle; a second material-temperature adjustment device, coupled with the second nozzle; and a control circuit, coupled with the first pump, the first material-temperature adjustment device, the second pump, and the second material-temperature adjustment device, and arranged to operably control the first pump and the second pump; wherein the control circuit is further arranged to operably control the first material-temperature adjustment device to adjust a temperature of the first fluid material transmitted from the first pump to produce and output first temperature-adjusted material to the first nozzle, so that the first nozzle outputs the first temperature-adjusted material to the target container; and wherein the control circuit is further arranged to operably control the second material-temperature adjustment device to adjust a temperature of the second fluid material transmitted from the second pump to produce and output second temperature-adjusted material to the second nozzle, so that the second nozzle outputs the second temperature-adjusted material to the target container.

Another example embodiment of a fluid material dispensing apparatus is disclosed, comprising: a water input port; a first nozzle; a second nozzle; a pump, coupled between an outlet connector of a material container and the first nozzle, and arranged to operably extract a fluid material from the material container and to operably push the fluid material to flow toward the first nozzle; a material-temperature adjustment device, comprising: a material buffer chamber, coupled with the first nozzle, and arranged to operably receive a first predetermined volume of the fluid material transmitted from the pump, wherein a length of material buffer chamber is greater than a first predetermined length, or an inner diameter of the material buffer chamber is less than a first predetermined value; a first heating device, coupled with the control circuit, and arranged to operably heat the fluid material within the material buffer chamber, wherein the first heating device surrounds at least a portion of an outer surface of the material buffer chamber; and a first cooling device, coupled with the control circuit, and arranged to operably cool the fluid material within the material buffer chamber, wherein the first cooling device surrounds at least a portion of the outer surface of the material buffer chamber; a water-temperature adjustment device, comprising: a water buffer chamber, coupled between the water input port and the second nozzle, and arranged to operably receive a second predetermined volume of the water transmitted from the water input port, wherein a length of water buffer chamber is greater than a second predetermined length, or an inner diameter of the water buffer chamber is less than a second predetermined value; a second heating device, coupled with the control circuit, and arranged to operably heat the water within the water buffer chamber, wherein the second heating device surrounds at least a portion of an outer surface of the water buffer chamber; and a second cooling device, coupled with the control circuit, and arranged to operably cool the water within the water buffer chamber, wherein the second cooling device surrounds at least a portion of the outer surface of the water buffer chamber; a control circuit, coupled with the pump, the material-temperature adjustment device, and the water-temperature adjustment device, and arranged to operably control the pump; a material-temperature sensor, coupled with the control circuit, and arranged to operably sense and report a temperature of the fluid material within the material buffer chamber to the control circuit; and a water-temperature sensor, coupled with the control circuit, and arranged to operably sense and report a temperature of the water within the water buffer chamber to the control circuit; wherein the second predetermined volume is greater than the first predetermined volume; wherein the control circuit is further arranged to operably control the material-temperature adjustment device to adjust the temperature of the fluid material within the material-temperature adjustment device to produce and output temperature-adjusted material to the first nozzle, so that the first nozzle outputs the temperature-adjusted material to the target container; wherein the control circuit is further arranged to operably control the water-temperature adjustment device to adjust the temperature of water within the water-temperature adjustment device to produce and output temperature-adjusted water to the second nozzle, so that the second nozzle outputs the temperature-adjusted water to the target container.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
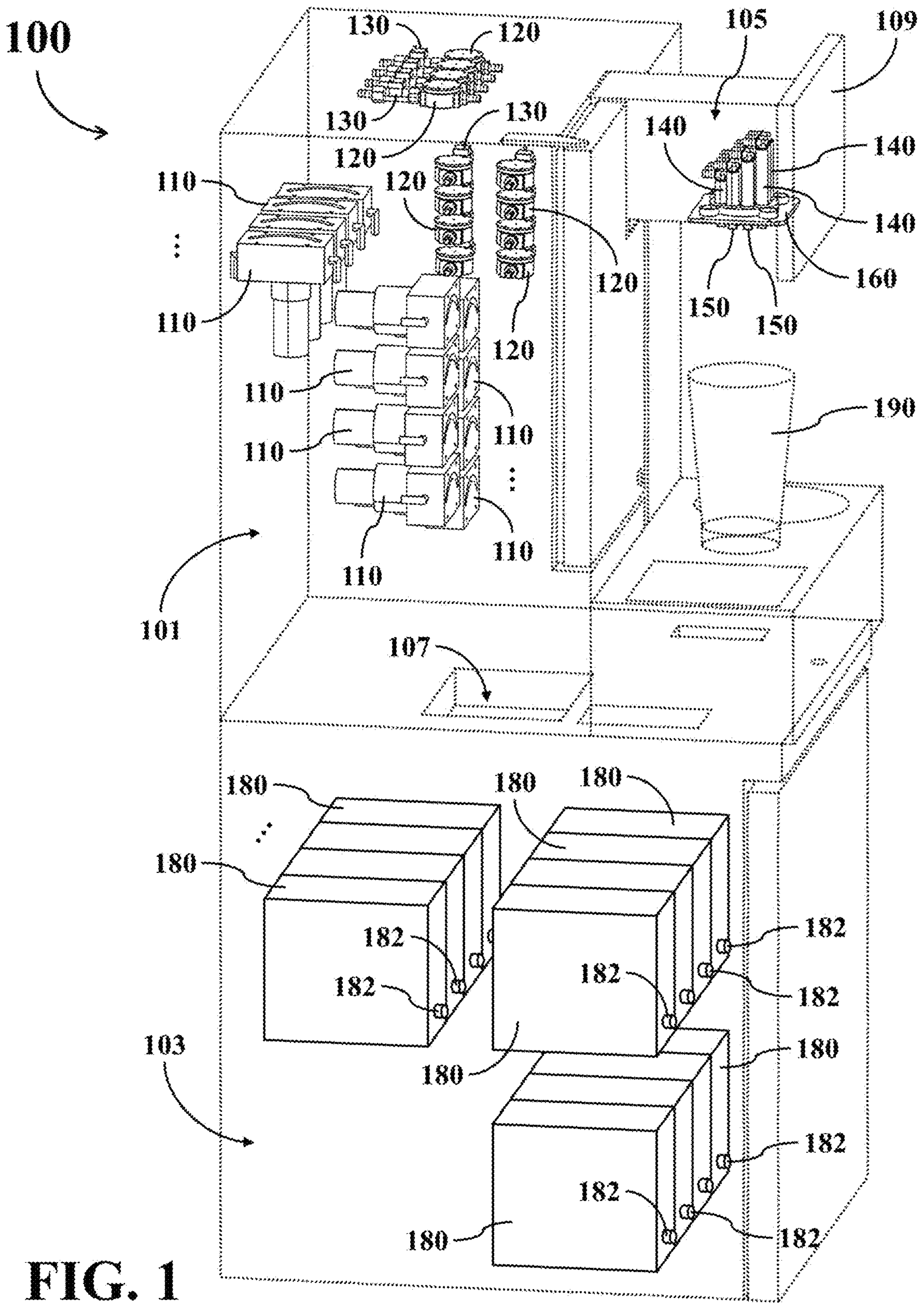
FIG. 1 shows a simplified schematic perspective diagram of a fluid material dispensing apparatus according to one embodiment of the present disclosure.
Figure 2:
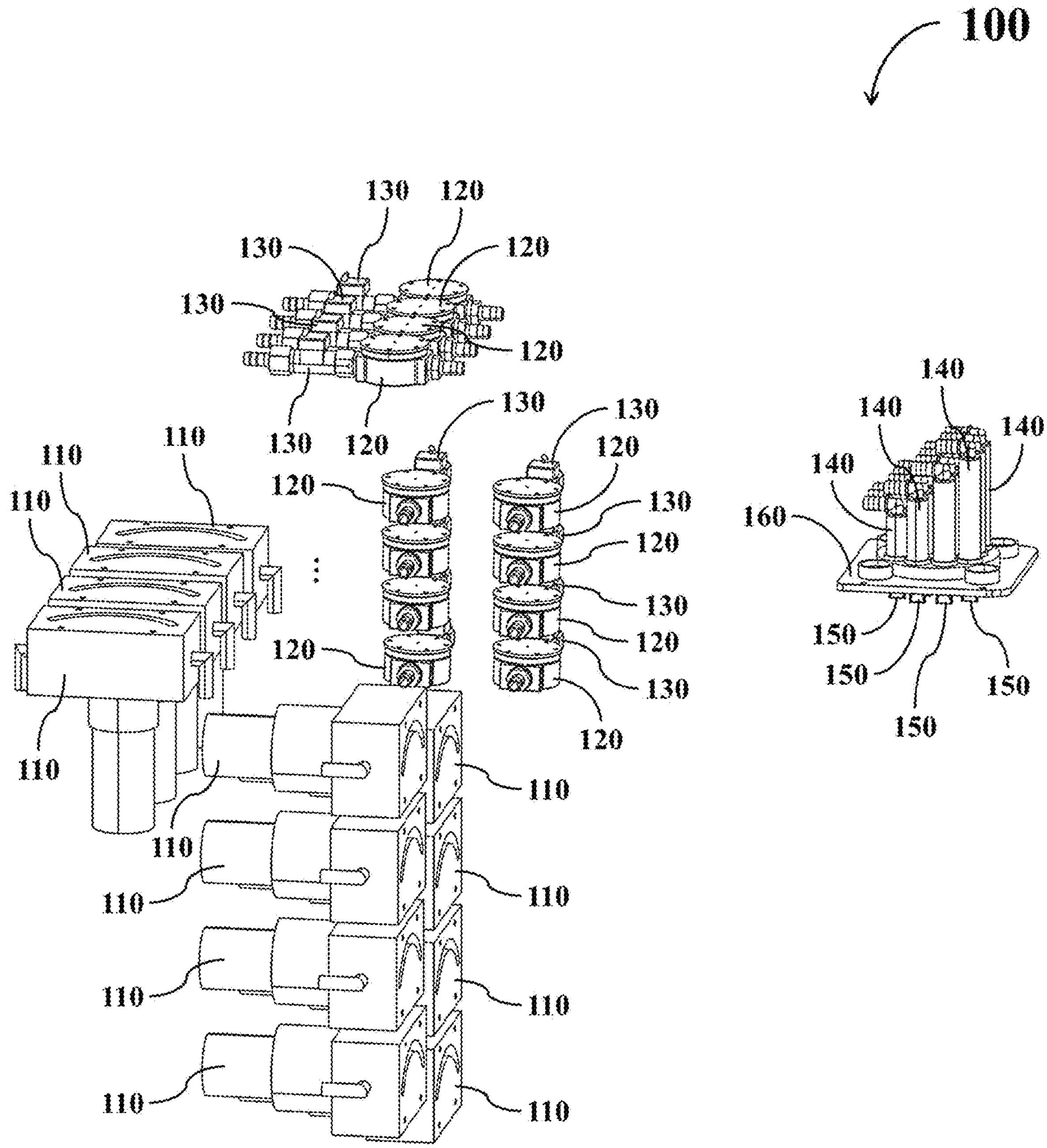
FIGS. 2~3 show simplified schematic diagrams illustrating spatial arrangement of some components of the fluid material dispensing apparatus of FIG. 1 from different viewing angles.
Figure 3:
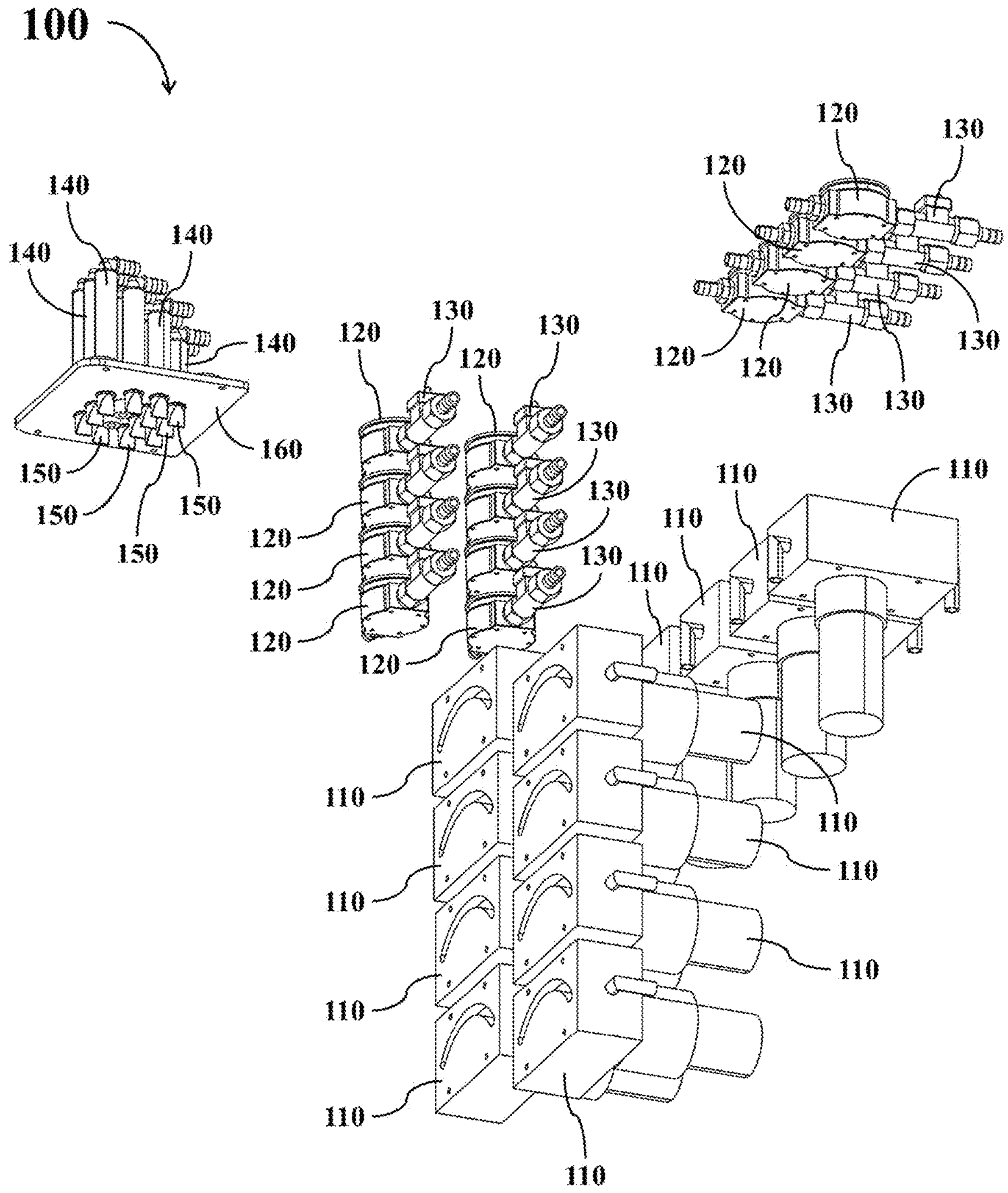

Please refer to FIG. 1 through FIG. 3. FIG. 1 shows a simplified schematic perspective diagram of a fluid material dispensing apparatus 100 according to one embodiment of the present disclosure. FIGS. 2~3 show simplified schematic diagrams illustrating spatial arrangement of some components of the fluid material dispensing apparatus 100 from different viewing angles. The fluid material dispensing apparatus 100 may be utilized to automatically conduct beverage preparation operations to make beverages or output various fluid materials (e.g., various sauces) for use in food seasoning.

In the embodiment of FIG. 1, the fluid material dispensing apparatus 100 comprises an upper chamber 101, a lower chamber 103, a neck chamber 105, one or more connecting channels 107, and a control panel 109. In order to reduce the complexity of the drawing contents, the appearance outline of the fluid material dispensing apparatus 100 is deliberately represented by dashed lines in FIG. 1, while some internal objects to be further described in the following are depicted with solid lines. Please note that the appearance shape of the fluid material dispensing apparatus 100 is merely a simplified exemplary embodiment for the purpose of explanatory convenience, rather than a restriction to the actual appearance of the fluid material dispensing apparatus 100.

The upper chamber 101 of the fluid material dispensing apparatus 100 may be connected to the neck chamber 105, and may be connected to the lower chamber 103 through the connecting channel 107. Relevant wires, signal lines, connectors, and/or material transmission pipes may be arranged inside the fluid material dispensing apparatus 100 in a variety of appropriate ways.

As shown in FIG. 1 through FIG. 3, the fluid material dispensing apparatus 100 further comprises a plurality of pumps 110, a plurality of damper devices 120, a plurality of flowmeters 130, a plurality of material-temperature adjustment devices 140, a plurality of nozzles 150, and a connecting plate 160.

Each of the aforementioned pumps 110 may be connected to other components through various material transmission pipes and connectors, and may be installed within the upper chamber 101, the lower chamber 103, and/or the neck chamber 105 in a variety of appropriate spatial arrangements, not restricted to the spatial arrangement shown in FIG. 1 through FIG. 3.

Each of the aforementioned damper devices 120 and flowmeters 130 may be connected to other components through various material transmission pipes and connectors, and may be installed within the upper chamber 101, the lower chamber 103, and/or the neck chamber 105 in a variety of appropriate spatial arrangements, not restricted to the spatial arrangement shown in FIG. 1 through FIG. 3.

Each of the aforementioned material-temperature adjustment devices 140 may be connected to other components through various material transmission pipes and connectors, and may be installed within the neck chamber 105 in a variety of appropriate spatial arrangements, not restricted to the spatial arrangement shown in FIG. 1 through FIG. 3.

The aforementioned nozzles 150 may be detachably arranged on the connecting plate 160 through various appropriate connections, and the connecting plate 160 may be detachably arranged beneath the neck chamber 105 through various appropriate connections, not restricted to the spatial arrangement shown in FIG. 1 through FIG. 3. In addition, the input terminal of each nozzle 150 may be connected to the output terminal of a corresponding material-temperature adjustment device 140 through various material transmission pipes and connectors. The output terminals of respective nozzles 150 and the connecting plate 160 can be exposed outside the neck chamber 105 to facilitate the user to carry out relevant cleaning procedures.

As shown in FIG. 1, multiple material containers 180 may be placed within the lower chamber 103 of the fluid material dispensing apparatus 100. Different material containers 180 may be utilized to store different fluid materials. For example, the aforementioned fluid material may be common beverage base materials, such as water, sparkling water, black tea, green tea, soy milk, milk, milk-based liquids, coffee, nut pulps, various fruit-based concentrates, various vegetable-based concentrates, or the like.

For another example, the aforementioned fluid material may be various syrups, such as agave syrup, dulce de leche, fructose, golden syrup, lemonade syrups, maltose syrup, maple syrup, molasses, orgeat, and/or palm syrup, or the like.

For yet another example, the aforementioned fluid material may be various alcoholic beverages, such as beer, cocktails, and/or sake, or the like.

For yet another example, the aforementioned fluid material may be various sauces or fluid condiments, such as apple sauce, chutneys, cranberry sauce, salad dressings, fruit coulis, ketchup, tomato sauce, mayonnaise, meat gravies, miso sauce, hummus, pasta sauce, piccalilli, soy sauce, spices sauce, spicy sauce, and/or ginger jam, or the like.

For yet another example, the aforementioned fluid material may be various fluid materials, such as fruit juices containing fruit pulps, tea liquids with small particles (e.g., pearl or tapioca balls), honey, cooking oils, vinegar, jams, marmalade, pressed fruit paste, beer vinegar, buttercream, condensed milk, and/or cream, or the like.

As can be appreciated from the foregoing descriptions, the fluid material that the fluid material dispensing apparatus 100 can output may be fluid having higher viscosity than water, and may be fluid having lower viscosity than water.

Each material container 180 has an outlet connector 182, which may be connected to a corresponding component (e.g., a corresponding pump 110 or a corresponding damper device 120) through various material transmission pipes and connectors.

In other embodiments, all of or some of the material containers 180 may be instead placed within the upper chamber 101, without being restricted to the spatial arrangement shown in FIG. 1. In practice, appropriate refrigeration equipment may be installed within the fluid material dispensing apparatus 100 to extend the storage time of various fluid materials.

Please note that the quantity of the pumps 110, the damper devices 120, the flowmeters 130, the material-temperature adjustment devices 140, the nozzles 150, the connecting plate 160, and the material containers 180 shown in FIG. 1 through FIG. 3 is merely an exemplary embodiment, rather than a restriction to the practical implementations.

Figure 4:
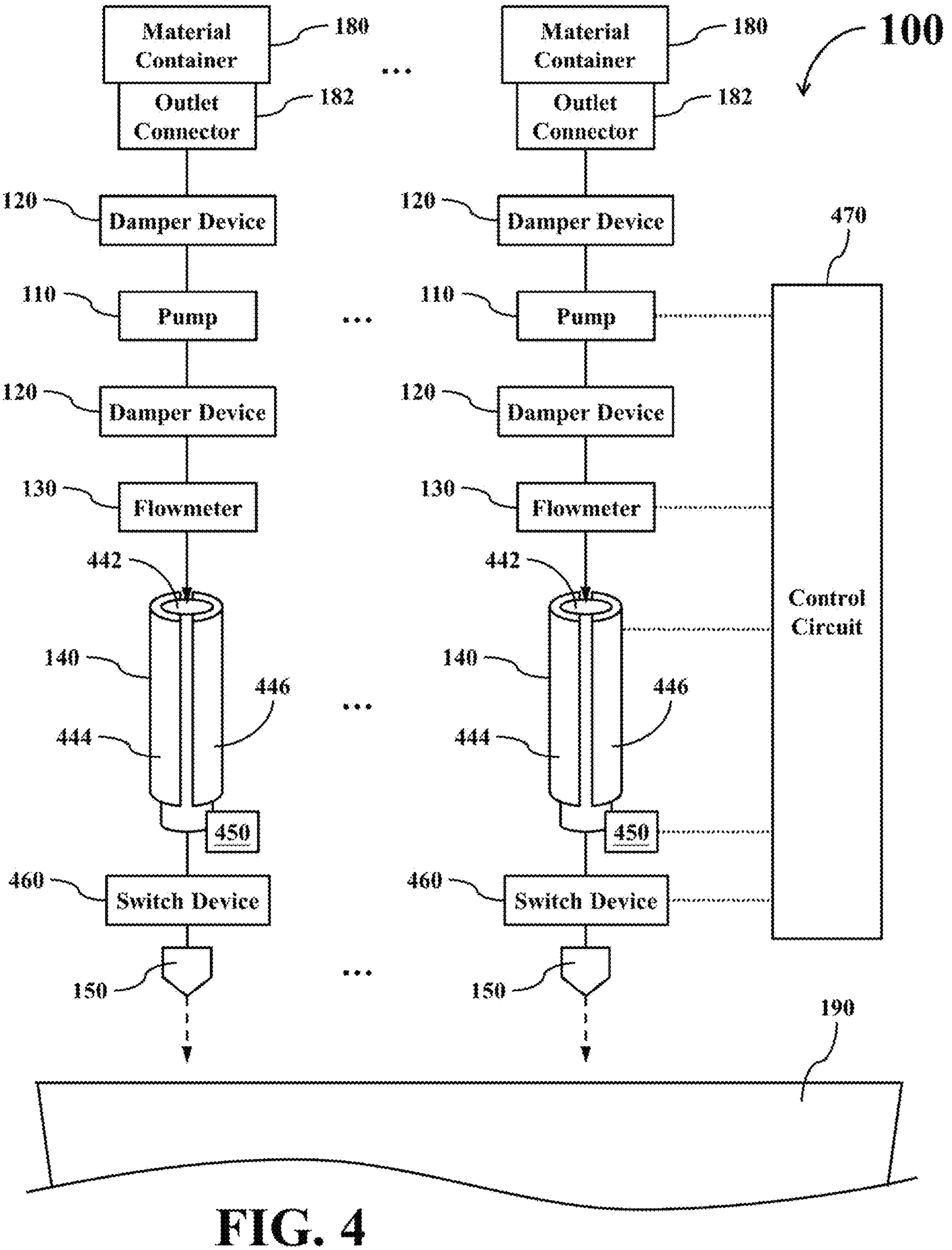
FIG. 4 shows a simplified functional block diagram of some components of the fluid material dispensing apparatus of FIG. 1 according to a first embodiment of the present disclosure.

Please refer to FIG. 4, which shows a simplified functional block diagram of some components of the fluid material dispensing apparatus 100 according to one embodiment of the present disclosure. The fluid material dispensing apparatus 100 comprises multiple material dispensing devices, which are respectively responsible for delivering the fluid materials stored in different material containers 180 to the output terminals of corresponding nozzles 150.

The operations of the multiple material dispensing devices are controlled by a control circuit 470. Each material dispensing device comprises a pump 110, one or more damper devices 120, a flowmeter 130, a material-temperature adjustment device 140, a material-temperature sensor 450, a corresponding nozzle 150, and a switch device 460. The pump 110, the one or more damper devices 120, the flowmeter 130, the material-temperature adjustment device 140, the corresponding nozzle 150, and the switch device 460 may be connected by appropriate material transmission pipes and connectors to form a material transmission channel.

In order to reduce the complexity of the drawing contents, only two exemplary material dispensing devices are shown in FIG. 4 as an example for explanation. The components and operating mechanism of each material dispensing device can be applied to other material dispensing devices in the fluid material dispensing apparatus 100.

In each material dispensing device, the pump 110 is arranged to operably push the received fluid material to flow forward. In practice, the pump 110 may be realized with various appropriate liquid pump devices capable of pushing liquid forward, such as a peristaltic pump, a diaphragm pump, a rotary diaphragm pump, or the like.

A material inlet of the pump 110 may be coupled with the outlet connector 182 of a corresponding material container 180 through appropriate connectors and material transmission pipes, and arranged to operably receive the fluid material transmitted from the corresponding material container 180 through the outlet connector 182.

The damper device 120 is arranged to operably conduct a buffering operation on the fluid material flowing through the damper device 120. In some embodiments, an input terminal of the damper device 120 is coupled with a material outlet of the pump 110. In other words, the damper device 120 may be located at the subsequent stage of the pump 110. In practice, the damper device 120 may be directly connected to the material outlet of the pump 110, or may be indirectly connected to the material outlet of the pump 110 through other appropriate connectors and material transmission pipes.

During the operations of the aforementioned pump 110, the fluid material may be intermittently pushed forward, and thus the liquid pressure at the material outlet of the pump 110 exhibits periodic fluctuations. Such a situation will cause the amount of the fluid material flowing into the damper device 120 to exhibit periodic fluctuations.

When the volume of the fluid material in the damper device 120 exceeds a predetermined amount (i.e., the nominal volume of the damper device 120), a buffer chamber of the damper device 120 will temporarily deform to expand, so that the amount of the fluid material in the damper device 120 can temporarily exceed the nominal volume of the damper device 120. Over time, the elastic restoring force of the buffer chamber will push the fluid material in the damper device 120 to flow toward the output terminal of the damper device 120, so that the amount of the fluid material in the damper device 120 will drop back to a level close to its nominal volume.

The flowmeter 130 may be coupled with the output terminal of the damper device 120, and arranged to operably measure the flow of fluid material passing through the flowmeter 130. In other words, the flowmeter 130 may be located at the subsequent stage of the damper device 120. In practice, the flowmeter 130 may be directly connected to the output terminal of the damper device 120, or may be indirectly connected to the output terminal of the damper device 120 through other appropriate connectors and material transmission pipes.

The material-temperature adjustment device 140 is coupled between the damper device 120 and a corresponding nozzle 150, and arranged to operably transmit received fluid material to the corresponding first nozzle 150. For example, the material-temperature adjustment device 140 may be coupled between the output terminal of the flowmeter 130 and the corresponding nozzle 150. In practice, the material-temperature adjustment device 140 may be indirectly connected to the output terminal of the flowmeter 130 through a connector with other appropriate material transmission pipes to increase the selection flexibility of the position of the material-temperature adjustment device 140.

The material-temperature sensor 450 is coupled with the control circuit 470, and arranged to operably sense and report the temperature of the fluid material within the material-temperature adjustment device 140 to the control circuit 470. In practice, the material-temperature sensor 450 may be arranged in any appropriate position inside the material-temperature adjustment device 140. Alternatively, the material-temperature sensor 450 may be attached on any appropriate position on the outer surface of the material-temperature adjustment device 140.

The nozzle 150 is coupled with the output terminal of the material-temperature adjustment device 140, and arranged to operably output the fluid material transmitted from the material-temperature adjustment device 140 to the target container 190. In practice, the nozzle 150 may be directly connected to the output terminal of the material-temperature adjustment device 140, or may be indirectly connected to the output terminal of the material-temperature adjustment device 140 through the aforementioned connecting plate 160 or other appropriate material transmission pipes. The nozzle 150 may be realized with a duckbill valve, a check valve, or other appropriate outlet connector.

The switch device 460 is coupled between the material-temperature adjustment device 140 and the nozzle 150, and arranged to operably control whether the fluid material can be transmitted to the nozzle 150 or not. In practice, the switch device 460 may be realized with various appropriate water gating devices, check valves, solenoid valves or the like.

As described previously, the damper device 120 conducts a buffering treatment to the fluid material flowing through the damper device 120 with the deformation and elastic restoring force of its buffer chamber. Accordingly, both the flow speed variation and the liquid pressure variation of the fluid material leaving the output terminal of the damper device 120 will be apparently lower than the flow speed variation and the liquid pressure variation of the fluid material received by the input terminal of the damper device 120. Such structure is beneficial for improving the measuring accuracy of the flowmeter 130 in measuring the flow of the fluid material passing through the flowmeter 130, thereby effectively increasing the liquid volume control accuracy of the fluid material dispensing apparatus 100 for fluid material to be dispensed.

If the aforementioned damper device 120 is omitted, both the flow speed variation and the liquid pressure variation of the fluid material flowing through the flowmeter 130 will become greater. Such a situation will cause a negative impact to the measuring accuracy of the flowmeter 130 in measuring the flow of the fluid material, thereby reducing the flow measurement accuracy of the flowmeter 130.

Please note that the structure and connections between components of the material dispensing device described previously is merely an exemplary embodiment, rather than a restriction to the practical implementations of the material dispensing device.

In another embodiment, for example, the damper device 120 and the flowmeter 130 may be instead located at the prior stage of the pump 110. Specifically, the input terminal of the damper device 120 may instead be coupled with the outlet connector 182 of a corresponding material container 180 through appropriate connectors and material transmission pipes, so as to receive the fluid material transmitted from the corresponding material container 180. On the other hand, the material inlet of the pump 110 may instead be coupled with the output terminal of the flowmeter 130, so as to receive the fluid material passed through the flowmeter 130. That is, the flowmeter 130 is coupled between the damper device 120 and the pump 110 in this embodiment. In practice, the material inlet of the pump 110 may be directly connected to the output terminal of the flowmeter 130, or may be indirectly connected to the output terminal of the flowmeter 130 through appropriate connectors or material transmission pipes.

In yet another embodiment, the damper device 120 may be instead located at the prior stage of the pump 110 and the flowmeter 130 may be instead located at the prior stage of the damper device 120. Specifically, the input terminal of the flowmeter 130 is coupled with the outlet connector 182 of a corresponding material container 180, the input terminal of the damper device 120 is coupled with the output terminal of the flowmeter 130, and the material inlet of the pump 110 is coupled with the output terminal of the damper device 120.

In yet another embodiment, a first damper device 120 is coupled with the material outlet of the pump 110, while a second damper device 120 is coupled between the outlet connector 182 and the material inlet of the pump 110. That is, each material dispensing device may comprise two damper devices 120. In this embodiment, the flowmeter 130 may be coupled with the output terminal of the first damper device 120, or coupled between the output terminal of the second damper device 120 and the material inlet of the pump 110.

It can be appreciated from the foregoing elaborations, by utilizing the damper device 120 to conduct a buffering operation on the fluid material flowing therethrough, the measurement accuracy of the flowmeter 130 in measuring the flow of the fluid material outputted from the damper device 120 can be significantly improved, thereby effectively increasing the output volume control accuracy of the fluid material dispensing apparatus 100 for fluid materials to be dispensed.

Even if the fluid materials employed by the fluid material dispensing apparatus 100 are liquids having a viscosity higher than water, for example, honey, various syrups, soy milks, nut pulps, fruit juice concentrates, fruit juices containing fruit pulps, tea-based liquids containing small particles (e.g., bubbles or tapioca balls), milk-based liquids, cooking oils, or other thick fluid material (e.g., various sauces) and so on, the usage amount of corresponding fluid material can be accurately measured and manipulated by adopting the material dispensing devices described previously.

As described previously, different customers have varying preferences or needs for beverage temperature. However, traditional beverage dispensers lack the ability to flexibly adjust the temperature of beverages according to customer preferences. If a customer wants to change the temperature of the beverage, either the customer or the staff would need to add ice into or heat the beverage made by a traditional beverage dispenser. Such approaches are not only inconvenient but also make it difficult to precisely control the temperature of the resulting beverage, which may even adversely affect the taste of the resulting beverage.

In order to resolve the above problem, the fluid material dispensing apparatus 100 adopts a clever mechanism to flexibly adjust the temperature of fluid materials to be dispensed and the temperature of water to be dispensed. In this way, the fluid material dispensing apparatus 100 is enabled to flexibly adjust the temperature of resulting beverages to thereby meet different customer preferences.

As described previously, the fluid material dispensing apparatus 100 comprises multiple material dispensing devices. For the purpose of explanatory convenience in the following specification, the material dispensing device located on the right-hand side of FIG. 4 is referred to as a first material dispensing device, while another material dispensing device shown located on the left-hand side of FIG. 4 is referred to as a second material dispensing device.

As shown in FIG. 4, the first material dispensing device comprises a first pump 110, a first damper device 120, a first flowmeter 130, a first material-temperature adjustment device 140, a first material-temperature sensor 450, a corresponding first nozzle 150, and a first switch device 460. Similarly, the second material dispensing device comprises a second pump 110, a second damper device 120, a second flowmeter 130, a second material-temperature adjustment device 140, a second material-temperature sensor 450, a corresponding second nozzle 150, and a second switch device 460.

In this embodiment, the first pump 110 is coupled between a first outlet connector 182 of a first material container 180 and the first nozzle 150, and arranged to operably extract a first fluid material from the first material container 180 and to operably push the first fluid material to flow toward the first nozzle 150.

The first damper device 120 is coupled between the first pump 110 and the first nozzle 150, and arranged to operably buffer the first fluid material flowing through the first damper device 120.

The first flowmeter 130 is coupled between the first damper device 120 and the first material-temperature adjustment device 140, and arranged to operably measure a flow of the first fluid material transmitted from the first damper device 120 to the first material-temperature adjustment device 140.

The first material-temperature adjustment device 140 is coupled between the first damper device 120 and the first nozzle 150, and arranged to operably adjust the temperature of the first fluid material transmitted from the first damper device 120, so as to produce and output a first temperature-adjusted material to the first nozzle 150.

The first material-temperature sensor 450 is coupled with the control circuit 470, and arranged to operably sense and report the temperature of the first fluid material within the first material-temperature adjustment device 140 to the control circuit 470.

The first switch device 460 is coupled between the first material-temperature adjustment device 140 and the first nozzle 150, and arranged to operably control whether the first temperature-adjusted material can be transmitted to the first nozzle 150 or not.

Similarly, in this embodiment, the second pump 110 is coupled between a second outlet connector 182 of a second material container 180 and the second nozzle 150, and arranged to operably extract a second fluid material, which is different from the first fluid material, from the second material container 180 and to operably push the second fluid material to flow toward the second nozzle 150.

The second damper device 120 is coupled between the second pump 110 and the second nozzle 150, and arranged to operably buffer the second fluid material flowing through the second damper device 120.

The second flowmeter 130 is coupled between the second damper device 120 and the second material-temperature adjustment device 140, and arranged to operably measure a flow of the second fluid material transmitted from the second damper device 120 to the second material-temperature adjustment device 140.

The second material-temperature adjustment device 140 is coupled between the second damper device 120 and the second nozzle 150, and arranged to operably adjust the temperature of the second fluid material transmitted from the second damper device 120, so as to produce and output a second temperature-adjusted material to the second nozzle 150.

The second material-temperature sensor 450 is coupled with the control circuit 470, and arranged to operably sense and report the temperature of the second fluid material within the second material-temperature adjustment device 140 to the control circuit 470.

The second switch device 460 is coupled between the second material-temperature adjustment device 140 and the second nozzle 150, and arranged to operably control whether the second temperature-adjusted material can be transmitted to the second nozzle 150 or not.

The control circuit 470 is coupled with the first pump 110, the first flowmeter 130, the first material-temperature adjustment device 140, the first switch device 460, the second pump 110, the second flowmeter 130, the second material-temperature adjustment device 140, and the second switch device 460. The control circuit 470 is arranged to operably control the operations of the first pump 110, the first material-temperature adjustment device 140, the first switch device 460, the second pump 110, the second material-temperature adjustment device 140, and the second switch device 460, and further arranged to operably receive the measurement results from the first flowmeter 130 and the second flowmeter 130.

When the fluid material dispensing apparatus 100 does not need to dispense any fluid material to the target container 190, the control circuit 470 may turn off the first switch device 460 and the second switch device 460, so that no fluid material can be dispensed to the target container 190 through the first nozzle 150 or the second nozzle 150.

When the fluid material dispensing apparatus 100 needs to dispense the first fluid material of a first predetermined temperature to the target container 190, the control circuit 470 controls the first pump 110 to operate, so that the first fluid material can be extracted from the first material container 180 and transported to the first material-temperature adjustment device 140 through the first damper device 120 and the first flowmeter 130. In addition, the control circuit 470 controls the first material-temperature adjustment device 140 to adjust the temperature of the first fluid material within the first material-temperature adjustment device 140. In this situation, the control circuit 470 can obtain the temperature of the first fluid material within the first material-temperature adjustment device 140 according to the measurement results of the first material-temperature sensor 450.

Afterwards, when the control circuit 470 determines that the temperature of the first fluid material within the first material-temperature adjustment device 140 reaches the first predetermined temperature, the control circuit 470 turns on the first switch device 460 to output a first temperature-adjusted material to the first nozzle 150, so that the first nozzle 150 can output the first temperature-adjusted material to the target container 190.

Similarly, when the fluid material dispensing apparatus 100 needs to dispense the second fluid material of a second predetermined temperature to the target container 190, the control circuit 470 controls the second pump 110 to operate, so that the second fluid material can be extracted from the second material container 180 and transported to the second material-temperature adjustment device 140 through the second damper device 120 and the second flowmeter 130. In addition, the control circuit 470 controls the second material-temperature adjustment device 140 to adjust the temperature of the second fluid material within the second material-temperature adjustment device 140. In this situation, the control circuit 470 can obtain the temperature of the second fluid material within the second material-temperature adjustment device 140 according to the measurement results of the second material-temperature sensor 450.

When the control circuit 470 determines that the temperature of the second fluid material within the second material-temperature adjustment device 140 reaches the second predetermined temperature, the control circuit 470 turns on the second switch device 460 to output a second temperature-adjusted material to the second nozzle 150, so that the second nozzle 150 can output the second temperature-adjusted material to the target container 190.

In the embodiment of FIG. 4, the first material-temperature adjustment device 140 comprises a first material buffer chamber 442, a first heating device 444, and a first cooling device 446. The first material buffer chamber 442 is coupled with the first nozzle 150, and arranged to operably receive a first predetermined volume of the first fluid material transmitted from the pump 110. The first heating device 444 is coupled with the control circuit 470, and arranged to operably heat the first fluid material within the first material buffer chamber 442 under control of the control circuit 470. The first cooling device 446 is coupled with the control circuit 470, and arranged to operably cool the first fluid material within the first material buffer chamber 442 under control of the control circuit 470.

In this situation, the first material-temperature sensor 450 may be arranged to operably sense and report the temperature of the first fluid material within the first material buffer chamber 442 to the control circuit 470.

As shown in FIG. 4, the first heating device 444 may surround at least a portion of the outer surface of the first material buffer chamber 442. The first heating device 444 may be attached on the outer surface of the first material buffer chamber 442, or may be slightly separated from the first material buffer chamber 442 with an appropriate spacing.

Similarly, the first cooling device 446 may surround at least a portion of the outer surface of the first material buffer chamber 442. The first cooling device 446 may be attached on the outer surface of the first material buffer chamber 442, or may be slightly separated from the first material buffer chamber 442 with an appropriate spacing.

In other embodiments, the first heating device 444 and/or the first cooling device 446 may be instead positioned inside the first material buffer chamber 442.

In order to improve the temperature adjustment efficiency, the length of the first material buffer chamber 442 may be designed to be greater than a first predetermined length (e.g., 2 cm, 3 cm, 4 cm, 5 cm, 6 cm, 7 cm, or 8 cm), and/or the inner diameter of the first material buffer chamber 442 may be designed to be less than a first predetermined value (e.g., 1.5 cm, 1.8 cm, 2.1 cm, 2.5 cm, 3 cm, or 3.5 cm).

Similarly, the second material-temperature adjustment device 140 of this embodiment comprises a second material buffer chamber 442, a second heating device 444, and a second cooling device 446. The second material buffer chamber 442 is coupled with the second nozzle 150, and arranged to operably receive a second predetermined volume of the second fluid material transmitted from the second damper device 120. The second heating device 444 is coupled with the control circuit 470, and arranged to operably heat the second fluid material within the second material buffer chamber 442 under control of the control circuit 470. The second cooling device 446 is coupled with the control circuit 470, and arranged to operably cool the second fluid material within the second material buffer chamber 442 under control of the control circuit 470.

In this situation, the second material-temperature sensor 450 may be arranged to operably sense and report the temperature of the second fluid material within the second material buffer chamber 442 to the control circuit 470.

As shown in FIG. 4, the second heating device 444 may surround at least a portion of the outer surface of the second material buffer chamber 442. The second heating device 444 may be attached on the outer surface of the second material buffer chamber 442, or may be slightly separated from the second material buffer chamber 442 with an appropriate spacing.

Similarly, the second cooling device 446 may surround at least a portion of the outer surface of the second material buffer chamber 442. The second cooling device 446 may be attached on the outer surface of the second material buffer chamber 442, or may be slightly separated from the second material buffer chamber 442 with an appropriate spacing.

In other embodiments, the second heating device 444 and/or the second cooling device 446 may be instead positioned inside the second material buffer chamber 442.

In order to improve the temperature adjustment efficiency, the length of the second material buffer chamber 442 may be designed to be greater than a second predetermined length, and/or the inner diameter of the second material buffer chamber 442 may be designed to be less than a second predetermined value.

In practice, each of the first heating device 444 and the second heating device 444 may be realized with various appropriate heater apparatuses capable of increasing the temperature of the fluid material within the corresponding material buffer chamber 442, such as various thermoelectric chips, hot water pipelines, electrical heaters, gas heaters, or the like.

Each of the first cooling device 446 and the second cooling device 446 may be realized with various appropriate cooler apparatuses capable of lowering the temperature of the fluid material within the corresponding material buffer chamber 442, such as various thermoelectric cooling chips, Peltier coolers, Peltier cells, cold water pipelines, heat sinks, or the like.

Accordingly, the disclosed fluid material dispensing apparatus 100 is capable of accurately controlling the material output volume of respective fluid materials, and thus it is able to maintain the taste consistency of resulting freshly made beverages.

In addition, the disclosed fluid material dispensing apparatus 100 is also capable of flexibly adjusting the temperature of different fluid materials to be dispensed, and thus it is able to flexibly adjust the temperature of resulting freshly made beverages. In this way, the fluid material dispensing apparatus 100 is able to meet different customer preferences.

Furthermore, the disclosed fluid material dispensing apparatus 100 is able to operate based on the parameters configured by the user to automatically utilize multiple material dispensing devices to output extracted fluid materials to the target container 190 through corresponding nozzles 150, and to automatically utilize the temperature-adjusted water dispensing device to output water with desired temperature and volume to the target container 190 through the corresponding nozzle 150, so as to achieve the automatic preparation of freshly made beverages. Therefore, the disclosed fluid material dispensing apparatus 100 not only effectively reduces the time and costs required for personnel training, but also significantly reduces the labor time required for the preparation of the freshly made beverages.

Figure 5:
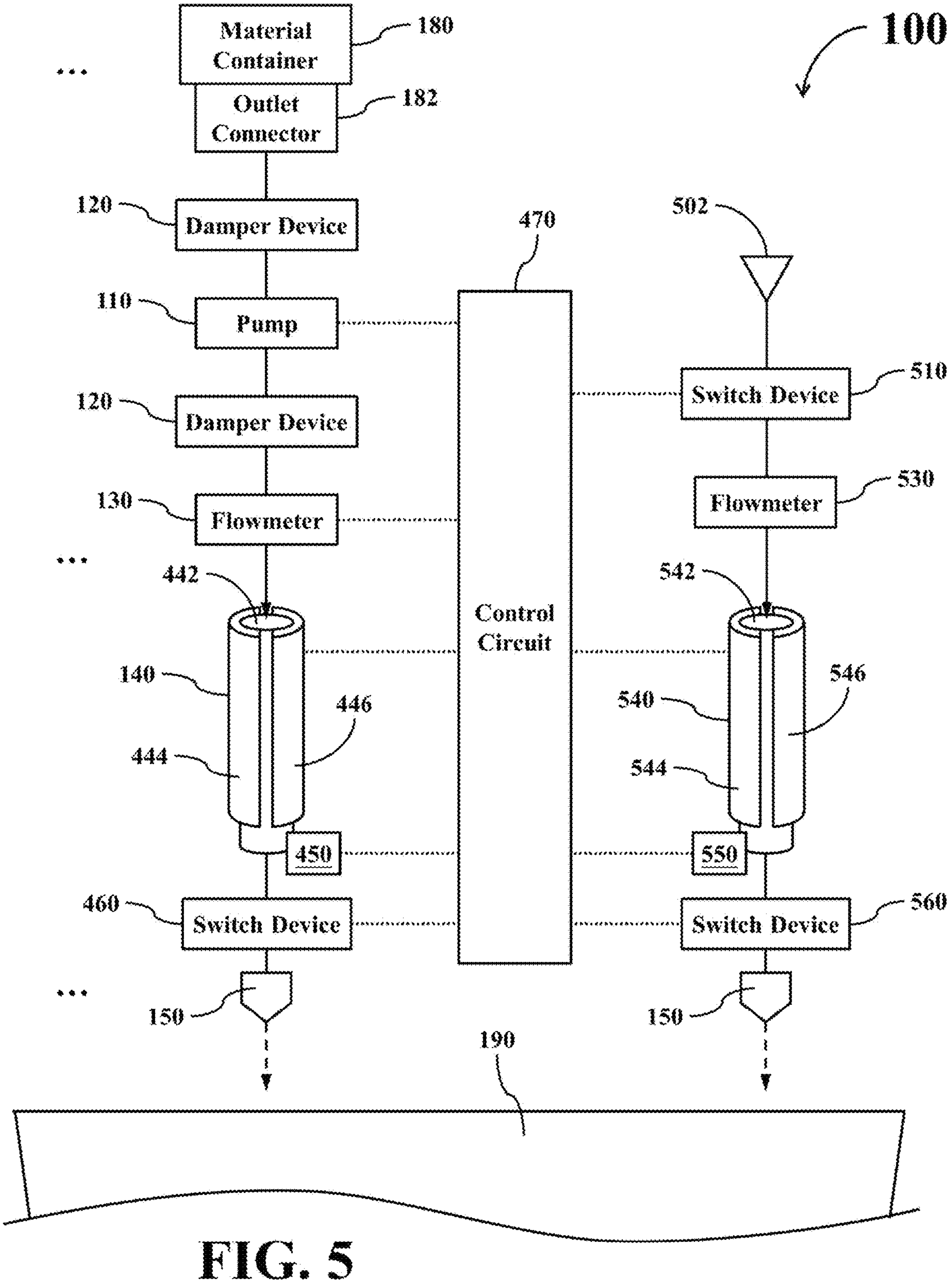
FIG. 5 shows a simplified functional block diagram of some components of the fluid material dispensing apparatus of FIG. 1 according to a second embodiment of the present disclosure.

Please refer to FIG. 5, which shows a simplified functional block diagram of the fluid material dispensing apparatus 100 according to another embodiment of the present disclosure. As shown in FIG. 5, in addition to the multiple material dispensing devices described previously, the fluid material dispensing apparatus 100 further comprises one or more temperature-adjusted water dispensing devices for flexibly adjusting the temperature of water to be dispensed into the target container 190.

In order to reduce the complexity of the drawing contents, only one exemplary material dispensing device and one exemplary temperature-adjusted water dispensing device are shown in FIG. 5 as an example for explanation, and other structures and devices of the fluid material dispensing apparatus 100 are not shown in FIG. 5.

The material dispensing device shown in FIG. 5 is identical to the material dispensing device shown in FIG. 4. Accordingly, the foregoing descriptions regarding the implementations, connections, operations, and related advantages of other corresponding functional blocks of the material dispensing devices in FIG. 4 are also applicable to the embodiment of FIG. 5.

The operations of the temperature-adjusted water dispensing device is controlled by the control circuit 470. As shown in FIG. 5, the temperature-adjusted water dispensing device comprises a water input port 502, a switch device 510, a flowmeter 530, a water-temperature adjustment device 540, a water-temperature sensor 550, a corresponding nozzle 150, and a switch device 560.

The water input port 502 is arranged to operably receive water without temperature adjustment from an outside environment of the fluid material dispensing apparatus 100, such as a water tap, an external water supply device, or a water filtering device.

The switch device 510 is coupled between the water input port 502 and the flowmeter 530, and arranged to operably control whether the water can be transmitted to the water-temperature adjustment device 540. In practice, the switch device 510 may be realized with various appropriate water gating devices, check valves, solenoid valves or the like.

The flowmeter 530 is coupled between the water input port 502 and the corresponding nozzle 150, and arranged to operably measure a flow of water to be dispensed to the target container 190. For example, the flowmeter 530 is coupled between the switch device 510 and the water-temperature adjustment device 540, and arranged to operably measure a flow of water transmitted from the water input port 502 to the material-temperature adjustment device 140.

The water-temperature adjustment device 540 is coupled between the water input port 502 and the corresponding nozzle 150, and arranged to operably adjust the temperature of the water transmitted from the water input port 502, so as to produce and output a temperature-adjusted water to the corresponding nozzle 150. For example, the water-temperature adjustment device 540 may be coupled between the flowmeter 530 and the corresponding nozzle 150.

The water-temperature sensor 550 is coupled with the control circuit 470, and arranged to operably sense and report the temperature of the water within the water-temperature adjustment device 540 to the control circuit 470.

The switch device 560 is coupled between the water-temperature adjustment device 540 and the corresponding nozzle 150, and arranged to operably control whether the temperature-adjusted water can be transmitted to the corresponding nozzle 150 or not.

The control circuit 470 is coupled with the switch device 510, the flowmeter 530, the water-temperature adjustment device 540, the water-temperature sensor 550, and the switch device 560. The control circuit 470 is further arranged to operably control the operations of the switch device 510, the water-temperature adjustment device 540, and the switch device 560, and arranged to operably receive the measurement results from the flowmeter 530 and the water-temperature sensor 550.

When the fluid material dispensing apparatus 100 does not need to dispense any water to the target container 190, the control circuit 470 may turn-off the switch device 560, so that no water can be dispensed to the target container 190 through the corresponding nozzle 150.

When the fluid material dispensing apparatus 100 needs to dispense water of a target temperature to the target container 190, the control circuit 470 turns on the switch device 510, so that the water without temperature adjustment can flow toward the water-temperature adjustment device 540 through the flowmeter 530. In addition, the control circuit 470 controls the water-temperature adjustment device 540 to adjust the temperature of the water within the water-temperature adjustment device 540. In this situation, the control circuit 470 can obtain the temperature of the water within the water-temperature adjustment device 540 according to the measurement results of the water-temperature sensor 550.

Afterwards, when the control circuit 470 determines that the temperature of the water within the water-temperature adjustment device 540 reaches the target temperature, the control circuit 470 turns on the switch device 560 to output a temperature-adjusted water to the corresponding nozzle 150, so that the nozzle 150 can output the temperature-adjusted water to the target container 190.

In the embodiment of FIG. 5, the first water-temperature adjustment device 540 comprises a water buffer chamber 542, a heating device 544, and a cooling device 546. The water buffer chamber 542 is coupled with the corresponding nozzle 150, and arranged to operably receive a second predetermined volume of the water transmitted from the water input port 502. The heating device 544 is coupled with the control circuit 470, and arranged to operably heat the water within the water buffer chamber 542 under control of the control circuit 470. The cooling device 546 is coupled with the control circuit 470, and arranged to operably cool the water within the water buffer chamber 542 under control of the control circuit 470.

In this situation, the water-temperature sensor 550 may be arranged to operably sense and report the temperature of the water within the water buffer chamber 542 to the control circuit 470.

For most freshly made beverages to be made by the fluid material dispensing apparatus 100, water is a major material. Therefore, the second predetermined volume may be designed to be greater than the aforementioned first predetermined volume, which means that the capacity of the water buffer chamber 542 may be greater than the material buffer chamber 442 described previously.

As shown in FIG. 5, the heating device 544 may surround at least a portion of the outer surface of the water buffer chamber 542. The heating device 544 may be attached on the outer surface of the water buffer chamber 542, or may be slightly separated from the water buffer chamber 542 with an appropriate spacing.

Similarly, the cooling device 546 may surround at least a portion of the outer surface of the water buffer chamber 542. The cooling device 546 may be attached on the outer surface of the water buffer chamber 542, or may be slightly separated from the water buffer chamber 542 with an appropriate spacing.

In other embodiments, the heating device 544 and/or the cooling device 546 may be instead positioned inside the water buffer chamber 542.

In order to improve the temperature adjustment efficiency, the length of the water buffer chamber 542 may be designed to be greater than a second predetermined length (e.g., 40 cm, 55 cm, 70 cm, 90 cm, 120 cm, 160 cm, or 200 cm), and/or the inner diameter of the water buffer chamber 542 may be designed to be less than a second predetermined value (e.g., 0.6 cm, 0.8 cm, 1 cm, 1.2 cm, 1.4 cm, 1.6 cm, 1.8 cm, 2 cm, or 2.5 cm). In one embodiment, the second predetermined length is greater than the aforementioned first predetermined length, while the second predetermined value is greater than the aforementioned first predetermined value. In another embodiment, the second predetermined length is equal to or greater than the aforementioned first predetermined length, while the second predetermined value is equal to or less than the aforementioned first predetermined value.

In practice, the heating device 544 may be realized with various appropriate heater apparatuses capable of increasing the temperature of the water within the water buffer chamber 542, such as various thermoelectric chips, hot water pipelines, electrical heaters, gas heaters, or the like.

The cooling device 546 may be realized with various appropriate cooler apparatuses capable of lowering the temperature of the water within the corresponding water buffer chamber 542, such as various thermoelectric cooling chips, Peltier coolers, Peltier cells, cold water pipelines, heat sinks, or the like.

In some embodiments where the fluid material dispensing apparatus 100 is utilized as an automated beverage preparation apparatus, a user may place a target container 190 on an appropriate position beneath the aforementioned multiple nozzles 150 and manipulate the control panel 109 to configure one or more production parameters for the required freshly made beverages, such as beverage item, cup size, beverage volume, sugar level, ice level, and/or quantity of cups, or the like.

Then, the temperature-adjusted water dispensing device of the fluid material dispensing apparatus 100 would operate based on the parameters configured by the user to selectively dispense the water without temperature or the temperature-adjusted water to the target container 190 through a corresponding nozzle 150.

In addition, the material dispensing devices of the fluid material dispensing apparatus 100 would operate based on the parameters configured by the user to automatically utilizes one or more pumps 110 to extract the fluid materials from one or more material containers 180, and to transmit the extracted fluid materials toward corresponding nozzles 150 through respective transmission pipes. With the continuous operation of respective pump, related fluid materials will be dispensed to the target container 190 through corresponding nozzles 150.

Freshly made beverage of a variety of flavors can be obtained by mixing different fluid materials together in the target container 190 according to a particular ratio, or by simple stirring after mixing the fluid materials. In practice, the target container 190 may be designed to support or have a blending functionality to increase the speed and uniformity of mixing the fluid materials.

In the embodiment where the fluid material dispensing apparatus 100 is utilized as a sauce dispensing apparatus, the user may place the target container 190 on an appropriate position beneath the aforementioned multiple nozzles 150 and manipulate the control panel 109 to configure species and output amount of related sauce to be dispensed.

Similarly, the temperature-adjusted water dispensing device of the fluid material dispensing apparatus 100 would operate based on the parameters configured by the user to selectively dispense the water without temperature or the temperature-adjusted water to the target container 190 through a corresponding nozzle 150.

In addition, the material dispensing devices of the fluid material dispensing apparatus 100 would operate based on the parameters configured by the user to automatically utilizes one or more pumps 110 to extract the fluid materials from one or more material containers 180, and to transmit the extracted fluid materials toward corresponding nozzles 150 through respective transmission pipes. With the continuous operation of respective pump, the fluid material dispensing apparatus 100 is enabled to output a specific amount of one or more sauces to the target container 190 through corresponding nozzle 150.

Accordingly, the fluid material dispensing apparatus 100 of FIG. 5 is capable of accurately controlling the material output volume of respective fluid materials, and thus it is able to maintain the taste consistency of resulting freshly made beverages.

In addition, the fluid material dispensing apparatus 100 of FIG. 5 is capable of flexibly adjusting the temperature of different fluid materials to be dispensed, and also capable of flexibly adjusting the temperature of water to be dispensed. Accordingly, the disclosed fluid material dispensing apparatus 100 is able to flexibly adjust the temperature of resulting freshly made beverages. In this way, the fluid material dispensing apparatus 100 is able to meet different customer preferences.

Furthermore, the disclosed fluid material dispensing apparatus 100 is able to operate based on the parameters configured by the user to automatically utilize multiple material dispensing devices to output extracted fluid materials to the target container 190 through corresponding nozzles 150, and to automatically utilize the temperature-adjusted water dispensing device to output water with desired temperature and volume to the target container 190 through the corresponding nozzle 150, so as to achieve the automatic preparation of freshly made beverages. Therefore, the disclosed fluid material dispensing apparatus 100 not only effectively reduces the time and cost required for personnel training, but also significantly reduces the labor time required for the preparation of the freshly made beverages.

Please note that the component structure and connections between components of the fluid material dispensing apparatus 100 in the aforementioned FIG. 4 through FIG. 5 are merely exemplary embodiments, rather than a restriction to the practical implementations of the fluid material dispensing apparatus 100.

Figure 6:
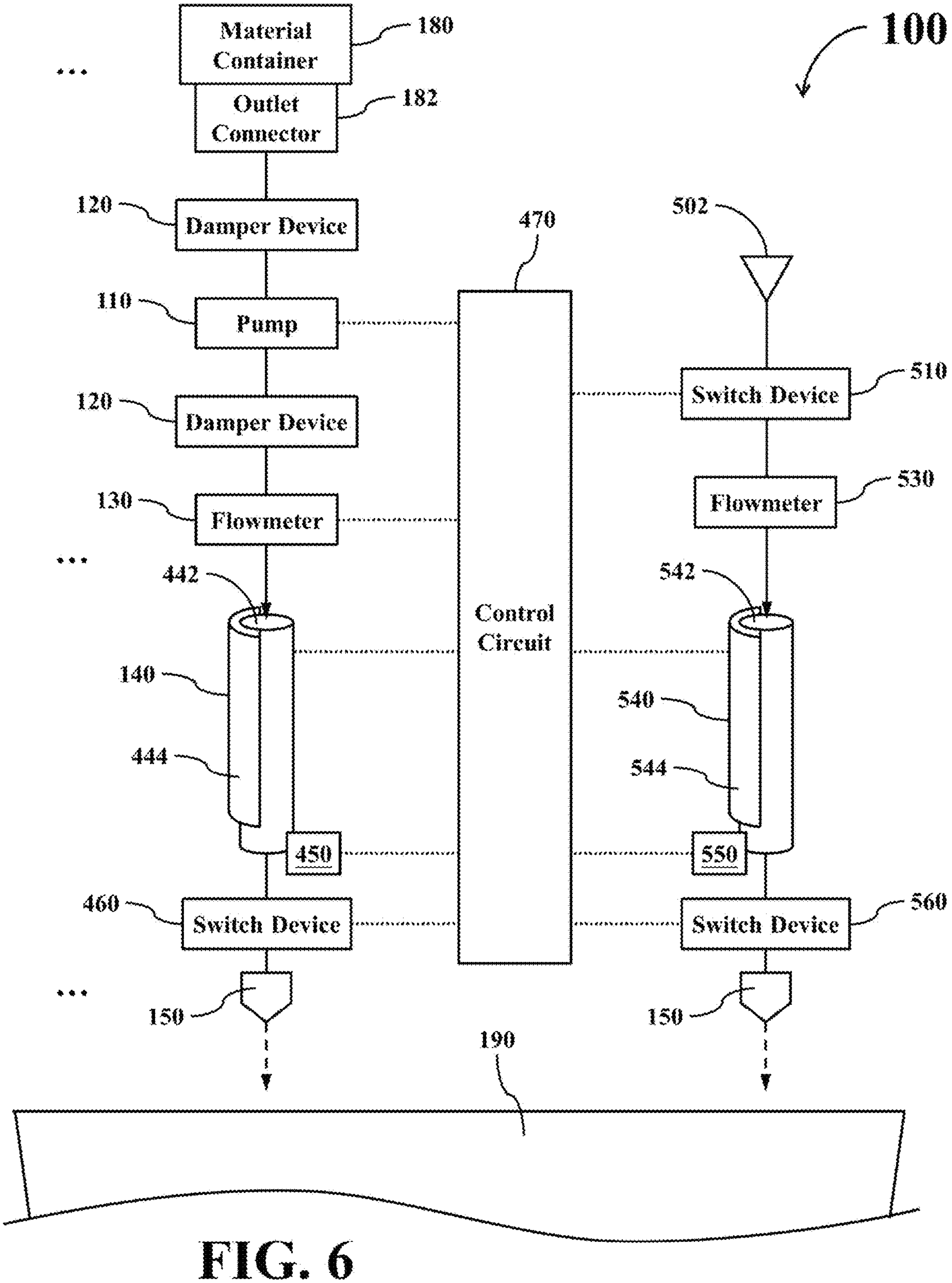
FIG. 6 shows a simplified functional block diagram of some components of the fluid material dispensing apparatus of FIG. 1 according to a third embodiment of the present disclosure.

For example, in some embodiments, the cooling device 446 and/or the cooling device 546 may be omitted as shown in FIG. 6.

Figure 7:
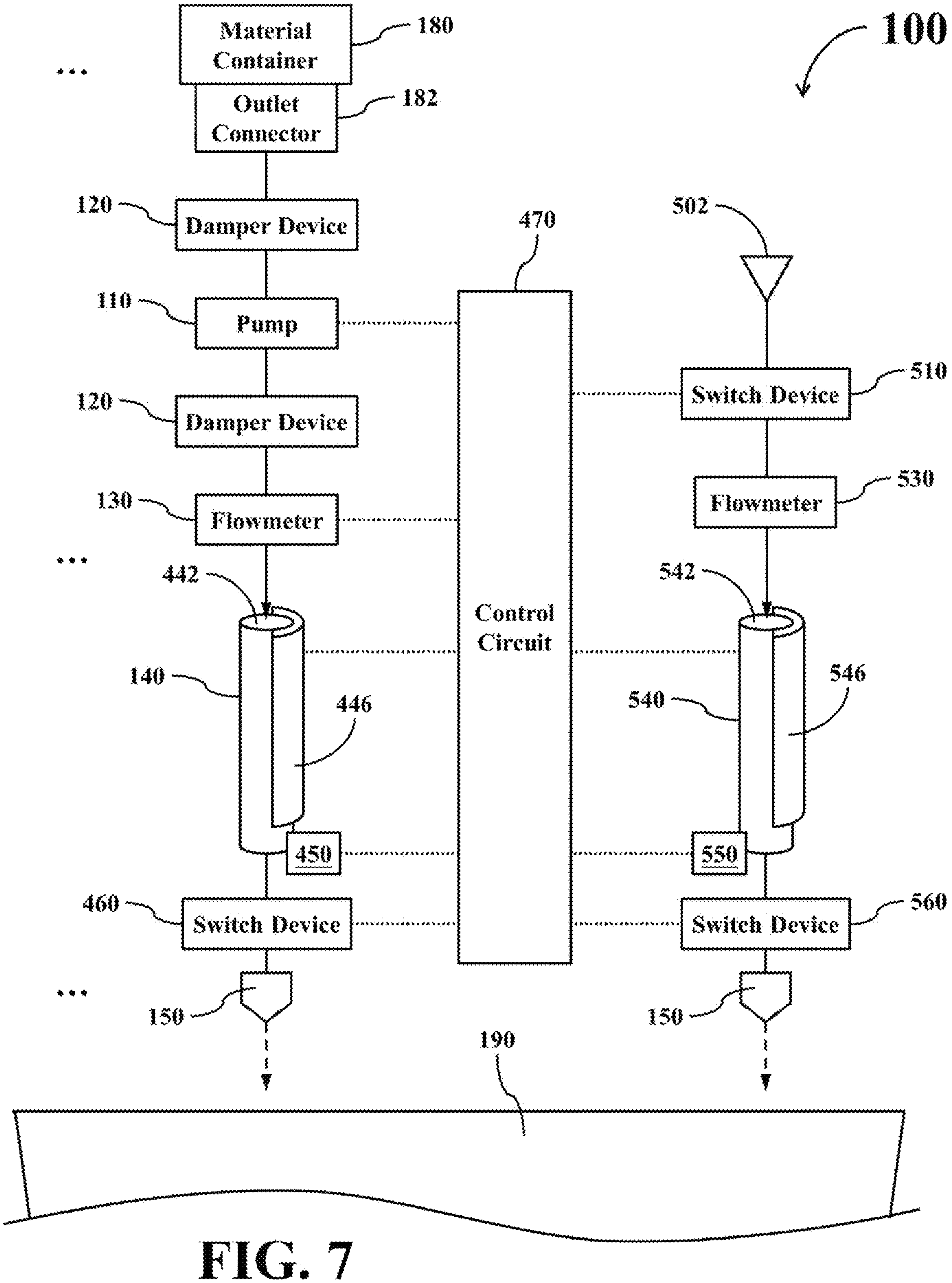
FIG. 7 shows a simplified functional block diagram of some components of the fluid material dispensing apparatus of FIG. 1 according to a fourth embodiment of the present disclosure.

For another example, in some embodiments, the heating device 444 and/or the heating device 544 may be omitted as shown in FIG. 7.

Figure 8:
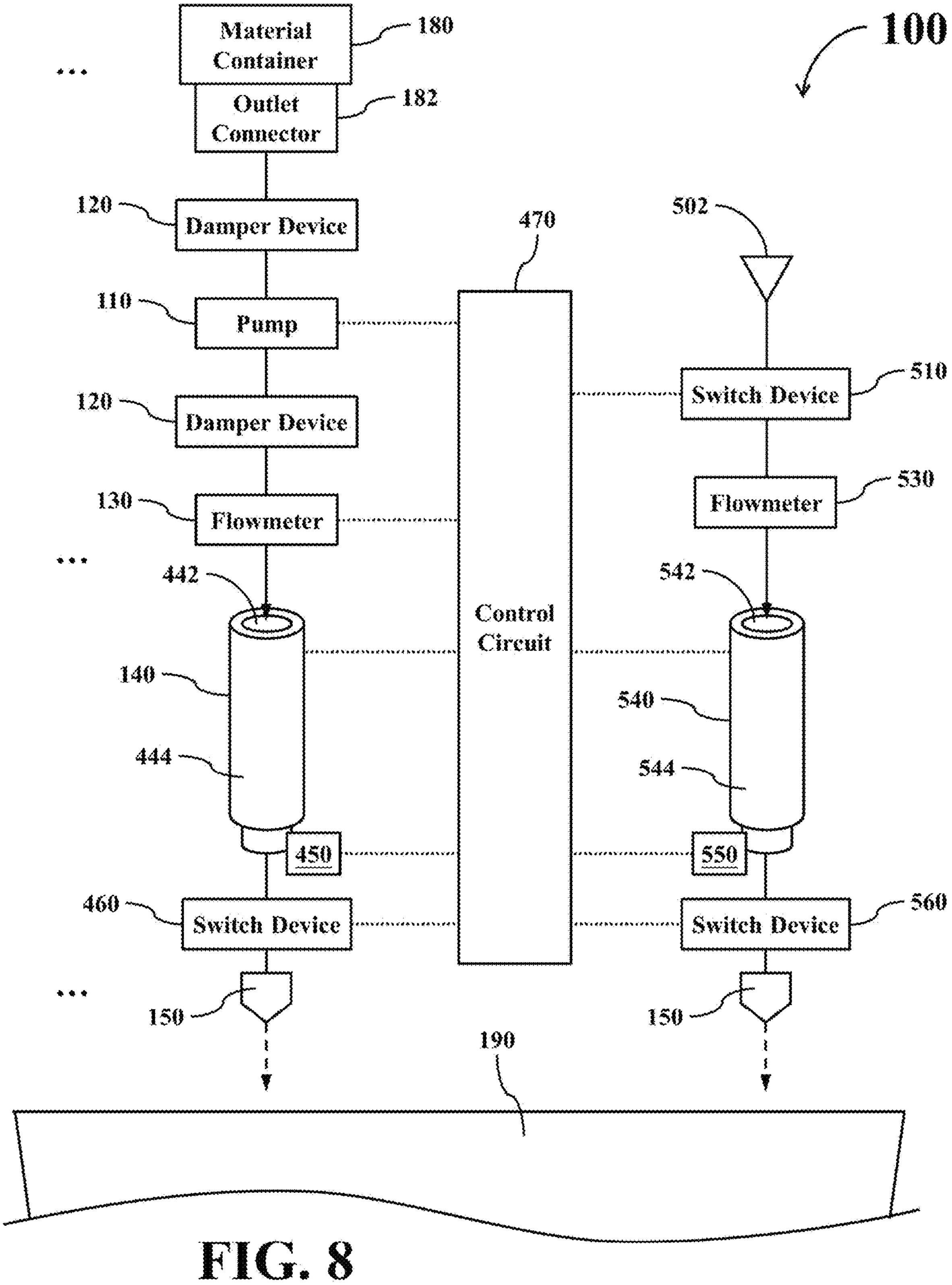
FIG. 8 shows a simplified functional block diagram of some components of the fluid material dispensing apparatus of FIG. 1 according to a fifth embodiment of the present disclosure.

For another example, in some embodiments, the cooling device 446 and/or the cooling device 546 may be omitted, and the heating device 444 may surround the outer surface of the material buffer chamber 442, while the heating device 544 may surround the outer surface of the water buffer chamber 542 as shown in FIG. 8.

In addition, the material buffer chamber 442, the water buffer chamber 542, the heating device 444, the heating device 544, the cooling device 446, and/or the cooling device 546 may be designed to have an appearance different from the embodiments described previously.

Figure 9:
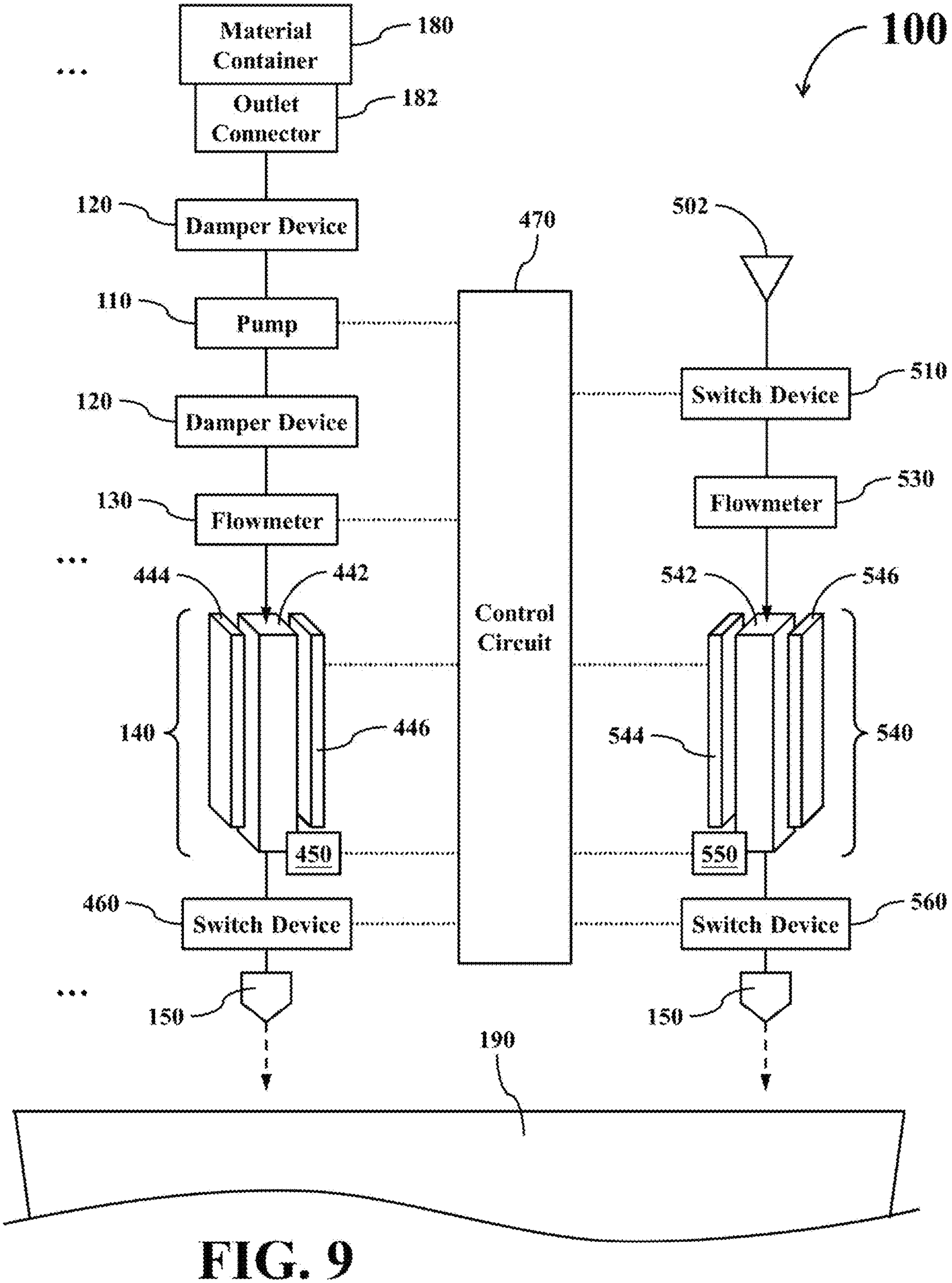
FIG. 9 shows a simplified functional block diagram of some components of the fluid material dispensing apparatus of FIG. 1 according to a sixth embodiment of the present disclosure.

For example, as shown in FIG. 9, the material buffer chamber 442 and the water buffer chamber 542 are designed to have a block-like shape, while the heating device 444, the heating device 544, the cooling device 446, and the cooling device 546 are designed to have a plate-like shape.

For another example, the water buffer chamber 542 may be realized with a portion of the water transmission pipe or connector between the water input port 502 and the corresponding nozzle 150. For example, the water buffer chamber 542 may be a part of the existing pipe or connector approaching the corresponding nozzle 150, instead of an additional component.

For another example, the switch device 510 of FIG. 5 through FIG. 9 may be realized with a pump 510. In this situation, the control circuit 470 may control the pump 510 to operably push water from the water input port 502 to flow toward the water-temperature adjustment device 540. In practice, the pump 510 may be realized with various appropriate liquid pump devices capable of pushing liquid forward, such as a peristaltic pump, a diaphragm pump, a rotary diaphragm pump, or the like.

For another example, the flowmeter 130 of FIG. 1 through FIG. 9 may be omitted. In this situation, the fluid material dispensing apparatus 100 may utilize a weight scale to measure changes in the weight of the target container 190, and the control circuit 470 may calculate the output volume of the fluid materials based on the measurement results of the weight scale. As a result, the control circuit 470 is enabled to control the output volume of the fluid materials without using the flowmeter 530.

Similarly, the flowmeter 530 of FIG. 5 through FIG. 9 may be omitted. In this situation, the fluid material dispensing apparatus 100 may utilize a weight scale to measure changes in the weight of the target container 190, and the control circuit 470 may calculate the output volume of the water based on the measurement results of the weight scale. As a result, the control circuit 470 is enabled to control the output volume of the water without using the flowmeter 530.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. For example, if this disclosure mentioned that a first circuit is coupled with a second circuit, it means that the first circuit may be directly or indirectly connected to the second circuit through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," "forward," "backward," and the like, may be used herein to describe the function of a particular element or to describe the relationship of one element to other element(s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath. For another example, if the element in the drawings is reversed, the action described as "forward" may become "backward," and the action described as "backward" may become "forward." Thus, the exemplary description "forward" can encompass both an orientation of forward and backward.

Throughout the description and claims, it will be understood that when an element is referred to as being "positioned on," "positioned above," "connected to," "engaged with," or "coupled with" another element, it can be directly on, directly connected to, or directly engaged with the other element, or intervening element may be present. In contrast, when an element is referred to as being "directly on," "directly connected to," or "directly engaged with" another element, there are no intervening elements present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A fluid material dispensing apparatus (100), comprising:

a first nozzle (150);

a second nozzle (150);

a pump (110), coupled between an outlet connector (182) of a material container (180) and the first nozzle (150), and arranged to operably extract a fluid material from the material container (180) and to operably push the fluid material to flow toward the first nozzle (150);

a material-temperature adjustment device (140), coupled with the first nozzle (150);

a water-temperature adjustment device (540), coupled between a water input port (502) and the second nozzle (150); and a control circuit (470), coupled with the pump (110), the material-temperature adjustment device (140), and the water-temperature adjustment device (540), and arranged to operably control the pump (110);

wherein the control circuit (470) is further arranged to operably control the material-temperature adjustment device (140) to adjust a temperature of the fluid material transmitted from the pump (110) to produce and output temperature-adjusted material to the first nozzle (150), so that the first nozzle (150) outputs the temperature-adjusted material to the target container (190); and wherein the control circuit (470) is further arranged to operably control the water-temperature adjustment device (540) to adjust a temperature of water transmitted from the water input port (502) to produce and output temperature-adjusted water to the second nozzle (150), so that the second nozzle (150) outputs the temperature-adjusted water to the target container (190).

2. The fluid material dispensing apparatus (100) of claim 1, further comprising:

a material-temperature sensor (450), coupled with the control circuit (470), and arranged to operably sense and report the temperature of the fluid material within the material-temperature adjustment device (140) to the control circuit (470).

3. The fluid material dispensing apparatus (100) of claim 2, wherein the material-temperature adjustment device (140) comprises:

a material buffer chamber (442), coupled with the first nozzle (150), and arranged to operably receive a first predetermined volume of the fluid material transmitted from the pump (110);

wherein the material-temperature sensor (450) is arranged to operably sense and report the temperature of the fluid material within the material buffer chamber (442) to the control circuit (470).

4. The fluid material dispensing apparatus (100) of claim 3, wherein the material-temperature adjustment device (140) further comprises:

a first heating device (444), coupled with the control circuit (470), and arranged to operably heat the fluid material within the material buffer chamber (442).

5. The fluid material dispensing apparatus (100) of claim 4, wherein the first heating device (444) surrounds at least a portion of an outer surface of the material buffer chamber (442).

6. The fluid material dispensing apparatus (100) of claim 4, wherein the material-temperature adjustment device (140) further comprises:

a first cooling device (446), coupled with the control circuit (470), and arranged to operably cool the fluid material within the material buffer chamber (442).

7. The fluid material dispensing apparatus (100) of claim 6, wherein the first cooling device (446) surrounds at least a portion of an outer surface of the material buffer chamber (442).

8. The fluid material dispensing apparatus (100) of claim 3, wherein the water-temperature adjustment device (540) comprises:

a water buffer chamber (542), coupled with the second nozzle (150), and arranged to operably receive a second predetermined volume of the water transmitted from the water input port (502);

wherein the water-temperature sensor (550) is arranged to operably sense and report the temperature of the water within the water buffer chamber (542) to the control circuit (470).

9. The fluid material dispensing apparatus (100) of claim 8, wherein a length of material buffer chamber (442) is greater than a first predetermined length, or an inner diameter of the material buffer chamber (442) is less than a first predetermined value;

wherein a length of water buffer chamber (542) is greater than a second predetermined length, or an inner diameter of the water buffer chamber (542) is less than a second predetermined value;

wherein the second predetermined length is greater than the first predetermined length, or the second predetermined value is less than the first predetermined value.

10. The fluid material dispensing apparatus (100) of claim 8, wherein the second predetermined volume is greater than the first predetermined volume.

11. The fluid material dispensing apparatus (100) of claim 8, wherein the water-temperature adjustment device (540) further comprises:

a second heating device (544), coupled with the control circuit (470), and arranged to operably heat the water within the water buffer chamber (542).

12. The fluid material dispensing apparatus (100) of claim 11, wherein the second heating device (544) surrounds at least a portion of an outer surface of the water buffer chamber (542).

13. The fluid material dispensing apparatus (100) of claim 11, wherein the water-temperature adjustment device (540) further comprises:

a second cooling device (546), coupled with the control circuit (470), and arranged to operably cool the water within the water buffer chamber (542).

14. The fluid material dispensing apparatus (100) of claim 13, wherein the second cooling device (546) surrounds at least a portion of an outer surface of the water buffer chamber (542).

15. The fluid material dispensing apparatus (100) of claim 2, further comprising:

a damper device (120), coupled between the pump (110) and the first nozzle (150), and arranged to operably buffer the fluid material flowing through the damper device (120); and a flowmeter (130), coupled between the damper device (120) and the material-temperature adjustment device (140), and arranged to operably measure a flow of the fluid material transmitted from the damper device (120) to the material-temperature adjustment device (140).

16. The fluid material dispensing apparatus (100) of claim 2, further comprising:

a first switch device (460), coupled between the material-temperature adjustment device (140) and the first nozzle (150), and arranged to operably control whether the temperature-adjusted material can be transmitted to the first nozzle (150); and a second switch device (560), coupled between the water-temperature adjustment device (540) and the second nozzle (150), and arranged to operably control whether the temperature-adjusted water can be transmitted to the second nozzle (150).

17. A fluid material dispensing apparatus (100), comprising:

a first nozzle (150);

a first pump (110), coupled between a first outlet connector (182) of a first material container (180) and the first nozzle (150), and arranged to operably extract a first fluid material from the first material container (180) and to operably push the first fluid material to flow toward the first nozzle (150);

a first material-temperature adjustment device (140), coupled with the first nozzle (150);

a second nozzle (150);

a second pump (110), coupled between a second outlet connector (182) of a second material container (180) and the second nozzle (150), and arranged to operably extract a second fluid material from the second material container (180) and to operably push the second fluid material to flow toward the second nozzle (150);

a second material-temperature adjustment device (140), coupled with the second nozzle (150); and a control circuit (470), coupled with the first pump (110), the first material-temperature adjustment device (140), the second pump (110), and the second material-temperature adjustment device (140), and arranged to operably control the first pump (110) and the second pump (110);

wherein the control circuit (470) is further arranged to operably control the first material-temperature adjustment device (140) to adjust a temperature of the first fluid material transmitted from the first pump (110) to produce and output first temperature-adjusted material to the first nozzle (150), so that the first nozzle (150) outputs the first temperature-adjusted material to the target container (190); and wherein the control circuit (470) is further arranged to operably control the second material-temperature adjustment device (140) to adjust a temperature of the second fluid material transmitted from the second pump (110) to produce and output second temperature-adjusted material to the second nozzle (150), so that the second nozzle (150) outputs the second temperature-adjusted material to the target container (190).

18. The fluid material dispensing apparatus (100) of claim 17, further comprising:

a first material-temperature sensor (450), coupled with the control circuit (470), and arranged to operably sense and report the temperature of the first fluid material within the first material-temperature adjustment device (140) to the control circuit (470); and a second material-temperature sensor (450), coupled with the control circuit (470), and arranged to operably sense and report the temperature of the second fluid material within the second material-temperature adjustment device (140) to the control circuit (470).

19. The fluid material dispensing apparatus (100) of claim 18, wherein the first material-temperature adjustment device (140) comprises:

a first material buffer chamber (442), coupled with the first nozzle (150), and arranged to operably receive a first predetermined volume of the first fluid material transmitted from the first pump (110), wherein the first material-temperature sensor (450) is arranged to operably sense and report the temperature of the first fluid material within the first material buffer chamber (442) to the control circuit (470);

wherein the second material-temperature adjustment device (140) comprises:

a second material buffer chamber (442), coupled with the second nozzle (150), and arranged to operably receive a second predetermined volume of the second fluid material transmitted from the second pump (110), wherein the second material-temperature sensor (450) is arranged to operably sense and report the temperature of the second fluid material within the second material buffer chamber (442) to the control circuit (470).

20. The fluid material dispensing apparatus (100) of claim 19, wherein a length of first material buffer chamber (442) is greater than 2 cm or an inner diameter of the first material buffer chamber (442) is less than 3.5 cm.

21. The fluid material dispensing apparatus (100) of claim 19, wherein the first material-temperature adjustment device (140) further comprises:

a first heating device (444), coupled with the control circuit (470), and arranged to operably heat the first fluid material within the first material buffer chamber (442);

wherein the second material-temperature adjustment device (140) further comprises:

a second heating device (444), coupled with the control circuit (470), and arranged to operably heat the second fluid material within the second material buffer chamber (442).

22. The fluid material dispensing apparatus (100) of claim 21, wherein the first heating device (444) surrounds at least a portion of an outer surface of the first material buffer chamber (442).

23. The fluid material dispensing apparatus (100) of claim 21, wherein the first material-temperature adjustment device (140) further comprises:

a first cooling device (446), coupled with the control circuit (470), and arranged to operably cool the first fluid material within the first material buffer chamber (442);

wherein the second material-temperature adjustment device (140) further comprises:

a second cooling device (446), coupled with the control circuit (470), and arranged to operably cool the second fluid material within the second material buffer chamber (442).

24. The fluid material dispensing apparatus (100) of claim 23, wherein the first cooling device (446) surrounds at least a portion of an outer surface of the first material buffer chamber (442).

25. The fluid material dispensing apparatus (100) of claim 18, further comprising:

a first damper device (120), coupled between the first pump (110) and the first nozzle (150), and arranged to operably buffer the first fluid material flowing through the first damper device (120);

a second damper device (120), coupled between the second pump (110) and the second nozzle (150), and arranged to operably buffer the second fluid material flowing through the second damper device (120);

a first flowmeter (130), coupled between the first damper device (120) and the first material-temperature adjustment device (140), and arranged to operably measure a flow of the first fluid material transmitted from the first damper device (120) to the first material-temperature adjustment device (140); and a second flowmeter (130), coupled between the second damper device (120) and the second material-temperature adjustment device (140), and arranged to operably measure a flow of the second fluid material transmitted from the second damper device (120) to the second material-temperature adjustment device (140).

26. The fluid material dispensing apparatus (100) of claim 18, further comprising:

a first switch device (460), coupled between the first material-temperature adjustment device (140) and the first nozzle (150), and arranged to operably control whether the first temperature-adjusted material can be transmitted to the first nozzle (150); and a second switch device (460), coupled between the second material-temperature adjustment device (140) and the second nozzle (150), and arranged to operably control whether the second temperature-adjusted material can be transmitted to the second nozzle (150).

27. A fluid material dispensing apparatus (100), comprising:

a water input port (502);

a first nozzle (150);

a second nozzle (150);

a pump (110), coupled between an outlet connector (182) of a material container (180) and the first nozzle (150), and arranged to operably extract a fluid material from the material container (180) and to operably push the fluid material to flow toward the first nozzle (150);

a material-temperature adjustment device (140), comprising:

a material buffer chamber (442), coupled with the first nozzle (150), and arranged to operably receive a first predetermined volume of the fluid material transmitted from the pump (110), wherein a length of material buffer chamber (442) is greater than a first predetermined length, or an inner diameter of the material buffer chamber (442) is less than a first predetermined value;

a first heating device (444), coupled with the control circuit (470), and arranged to operably heat the fluid material within the material buffer chamber (442), wherein the first heating device (444) surrounds at least a portion of an outer surface of the material buffer chamber (442); and a first cooling device (446), coupled with the control circuit (470), and arranged to operably cool the fluid material within the material buffer chamber (442), wherein the first cooling device (446) surrounds at least a portion of the outer surface of the material buffer chamber (442);

a water-temperature adjustment device (540), comprising:

a water buffer chamber (542), coupled between the water input port (502) and the second nozzle (150), and arranged to operably receive a second predetermined volume of the water transmitted from the water input port (502), wherein a length of water buffer chamber (542) is greater than a second predetermined length, or an inner diameter of the water buffer chamber (542) is less than a second predetermined value;

a second heating device (544), coupled with the control circuit (470), and arranged to operably heat the water within the water buffer chamber (542), wherein the second heating device (544) surrounds at least a portion of an outer surface of the water buffer chamber (542); and a second cooling device (546), coupled with the control circuit (470), and arranged to operably cool the water within the water buffer chamber (542), wherein the second cooling device (546) surrounds at least a portion of the outer surface of the water buffer chamber (542);

a control circuit (470), coupled with the pump (110), the material-temperature adjustment device (140), and the water-temperature adjustment device (540), and arranged to operably control the pump (110);

a material-temperature sensor (450), coupled with the control circuit (470), and arranged to operably sense and report a temperature of the fluid material within the material buffer chamber (442) to the control circuit (470); and a water-temperature sensor (550), coupled with the control circuit (470), and arranged to operably sense and report a temperature of the water within the water buffer chamber (542) to the control circuit (470);

wherein the second predetermined volume is greater than the first predetermined volume;

wherein the control circuit (470) is further arranged to operably control the material-temperature adjustment device (140) to adjust the temperature of the fluid material within the material-temperature adjustment device (140) to produce and output temperature-adjusted material to the first nozzle (150), so that the first nozzle (150) outputs the temperature-adjusted material to the target container (190);

wherein the control circuit (470) is further arranged to operably control the water-temperature adjustment device (540) to adjust the temperature of water within the water-temperature adjustment device (540) to produce and output temperature-adjusted water to the second nozzle (150), so that the second nozzle (150) outputs the temperature-adjusted water to the target container (190).

28. The fluid material dispensing apparatus (100) of claim 27, further comprising:

a damper device (120), coupled between the pump (110) and the first nozzle (150), and arranged to operably buffer the fluid material flowing through the damper device (120); and a flowmeter (130), coupled between the damper device (120) and the material-temperature adjustment device (140), and arranged to operably measure a flow of the fluid material transmitted from the damper device (120) to the material-temperature adjustment device (140).

29. The fluid material dispensing apparatus (100) of claim 27, further comprising:

a first switch device (460), coupled between the material-temperature adjustment device (140) and the first nozzle (150), and arranged to operably control whether the temperature-adjusted material can be transmitted to the first nozzle (150); and a second switch device (560), coupled between the water-temperature adjustment device (540) and the second nozzle (150), and arranged to operably control whether the temperature-adjusted water can be transmitted to the second nozzle (150).

* * * * *